Dec. 14, 1965    G. A. HENSON    3,222,811
HANDLE FOR FISHING RODS
Filed April 4, 1963
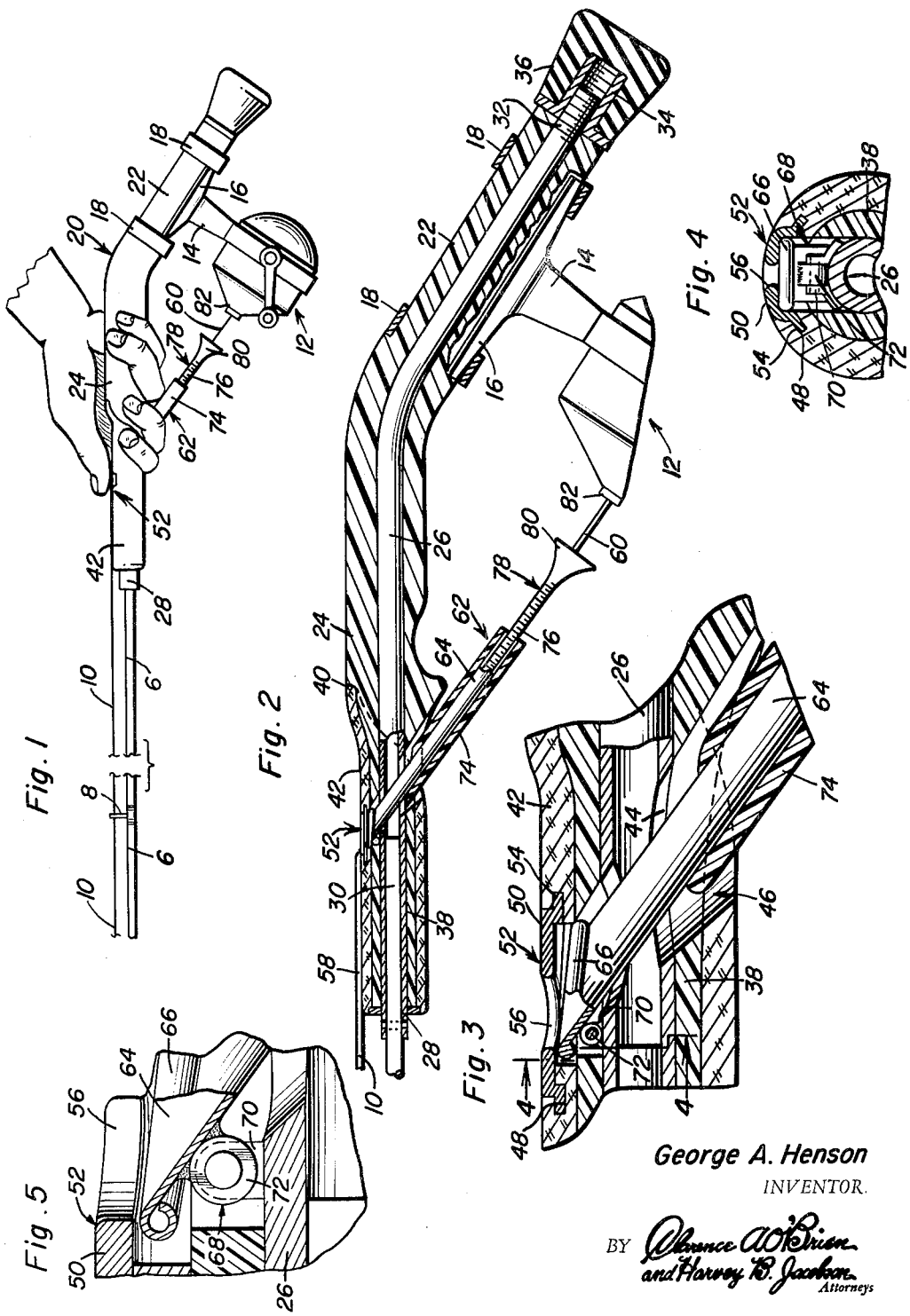
George A. Henson
INVENTOR.

United States Patent Office 3,222,811
Patented Dec. 14, 1965

3,222,811
HANDLE FOR FISHING RODS
George A. Henson, P.O. Box 513-A,
Green Mountain Falls, Colo.
Filed Apr. 4, 1963, Ser. No. 270,668
5 Claims. (Cl. 43—18)

The present invention relates to handle means for a fishing rod constructed and adapted to cope with all types of spinning reels.

An object of the invention is to provide a simple, practical and well balanced handle having two grips or grip portions, the forward or front grip having the coacting end of the spinning rod attached thereto and axially aligned therewith, and the inward or rearward grip being disposed at an obtuse angle and having means thereon to support the attachable and detachable spinning reel. To the ends desired the reel-equipped grip is disposed at an angle so that when the cast of the line is made there is little or no likelihood of the reel or the handle accidentally coming into contact with the angler's casting arm or adjacent portions of the body.

In addition to the well balanced feature the front or forwardmost handgrip has diagonal line passage means extending therethrough from top to bottom (or vice versa). The upper end of the passage terminates in an anti-friction line exit collar, or an equivalent member, the latter being in a position and aptly designed that when the angler's thumb is used properly in conjunction therewith, a satisfactory "line brake" is had.

The invention also features a handle whose forward grip is provided with a line passage and cooperating thumb seating collar and wherein a tubular member is mounted in part in the passage and serves as a line directing guide, the upper end being communicable with the thumb rest or collar and the lower end being equipped with novel means which can be properly oriented and correctly lined up with the line discharge means on the spinning reel.

Further, the tubular guide device has the lower end thereof, that is the end which is nearest to the reel's line outlet, provided with a longitudinally extensible and retractible inner tube or sleeve having a bell mouth which aids in feeding and guiding the fishing line from the properly oriented reel's exit to the intake of the tubular guiding device.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in side elevation and which shows a conventional spinning rod, a conventional spinning reel and the improved handle means the component grip portions of which serve to support the rod and reel, respectively;

FIGURE 2 is an enlarged view with parts in section and elevation showing fragmentary portions only of the rod and reel but detailing the component parts of the improved handle means;

FIGURE 3 is an enlarged fragmentary view of significant parts shown in section and elevation;

FIGURE 4 is a fragmentary section taken on the plane of the irregular section line 4—4 of FIGURE 3; and FIGURE 5 is an enlarged view fragmentarily shown and similar to FIGURE 3 and showing the hinging means for the tubular line guiding means.

With reference now to FIGURE 1 the numeral 6 designates a spinning rod with a guide eye 8 for that portion 10 of the fishing line which passes therethrough. The reel, which is here shown at 12 is a spinning reel, the same being carried by a bracket or stand 14 having a foot 16 which is of common construction and attachable by readily applicable and removable rings or the like 18 to the handle means 20. The handle means is constructed from an appropriate plastic material and embodies a rearward or inward portion proximal to the angler. This portion 22 constitutes the rearward handgrip and which is at an obtuse angle to the complemental forward handgrip 24. A bore through the handgrip portions 22 and 24 is lined with a metal or an equivalent sleeve or appropriate liner and this is denoted by the numeral 26. The forward end portion 28 of the liner projects beyond the forward end of the grip where it serves to accommodate the cooperating end portion 30 of the attachable spinning rod 6 (FIG. 2).

It will be noted that the handgrip 22 is of a slightly reduced cross-section and accommodates the rings or bands 18 which embrace and mount the feet of the bracket 16 in place in the manner illustrated. It will be further noted in FIGURE 2 that an end portion of the liner is screw-threaded as at 32 and is screwed into a screw-threaded socket 34 which is provided therefor in the detachable cap 36. The forwardmost end portion of the front or forward grip 24 is reduced in cross-section at 38 and extends back to the shoulder 40 this portion being encased in cork or the like as denoted at 42. The aforementioned liner 26, that is the portion which passes through the cork-covered member 38 has an opening therein at 44 (FIG. 3). There is also a diagonal passage at 46 which intersects the opening means 44 and this passage 46 extends from the bottom side of the forward handgrip through the diametrically opposite top side thereof where it cooperates with recess means which is denoted generally at 48 and which serves to accommodate the body portion 50 of an anti-friction collar 52 having a marginal attaching and retaining flange 54. The inner peripheral edge of the opening in the collar is smoothly rounded and thus provides an anti-friction convex surface 56 over which the payed out portion 58 of the line rides. The centrally apertured portion of the collar is dished to provide a seat or rest for the user's thumb (FIG. 1). The portion 60 of the line is threaded and slides freely through a guide device 62. This device comprises an oblique-angled guide tube or sleeve 64 whose upper end is provided, if desired, with a reinforcing bead 66, said upper end being hinged in place as at 68. The hinge means (FIG. 4) comprises a pair of spaced ears 70 fixed on the tube 26 and a hinge knuckle 72 carried by the tube 64 and pivotally mounted between said ears. The beaded upper end of the tube is aligned and oriented with the convex anti-friction edge 56 of the opening in the thumb seating collar 52. This tube extends downwardly through and below the bottom of the passage 46 and is coated or covered with a plastic or an equivalent jacket 74. The lower end of the tube is internally screw-threaded to accommodate the hollow screw-threaded shank portion 76 of a complemental thimble 78 which is adjustable and which embodies a flaring bell mouth 80 which can be adjustably oriented and aligned with the line discharge 82 of the reel 12.

It will be understood that the handle means with the adjustable line guide thereon adapts itself to highly satisfactory results in that it serves to accommodate all types of spinning reels. The handle means not only assures the desired balance but lessens the likelihood of the reel on the angularly bent rearward grip from coming into contact and colliding with the caster's arm or body. By feeding and passing the line through the variable tubular orienting and guiding device, unhampered and positive control of the cast is achieved with the aid of the caster's thumb (FIG. 1). As the lure or bait is cast, the thumb leaves the thumb rest and, at the moment the caster decides to terminate his cast, the thumb is used as a brake. The tubular device 62 delivering and transferring the line diagonally upward through the passage means in the handle is variable and can be pivoted to a proper angle to accommodate the particular type and size of spinning reel at hand.

In actual practice the thumb seating collar means 52 may be made of hard metal, perhaps carbon steel, and when expertly finished and shaped it provides a satisfactory seat for the thumb.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In combination, a spinning rod, one piece handle means embodying an elongated forward handgrip having its forward end portion connected to the reaward end of said spinning rod, and a complemental elongated rearward handgrip integrally joined to the rearward end of said forward handgrip and angled rearwardly and downwardly, a reel bracket mounted on and depending from the underneath side of said rearward handgrip, a spinning reel carried by said bracket and having a fishing line discharge, the median portion of said forward handgrip having a passage extending diagonally upwardly therethrough from the bottom side to and opening through the top side, an anti-friction collar embedded in said top side and having a line guiding opening axially aligned with the upper end of said passage, said collar being flush with said top side and providing a thumb rest, rearwardly downwardly inclined line guide means having an upper portion located and mounted in said passage and a lower portion depending below the underneath side of said forward handgrip and inclined toward, spaced forwardly of, and oriented and aligned with said line discharge, said line being threaded upwardly and slidingly through said line guide means and passing upwardly and forwardly through the opening in said collar.

2. The structure according to claim 1, and wherein said line guide means comprises a sleeve, the upper end of said sleeve being hingedly mounted in the upper end portion of said passage and the upper line discharge end thereof being aligned with the opening in said collar, an elongated thimble having an upper portion telescoping adjustably into the bore of the lower portion of said sleeve, the lower end of said thimble terminating in an outwardly flaring bell mouth, the latter being adjustably cooperable with said line discharge.

3. A fishing rod handle embodying forward and rearward handgrips, said forward handgrip being straight, said rearward handgrip also being straight but directed laterally downward and offset to minimize the likelihood of colliding with the angler's arm or otherwise hampering the cast and follow-through, said rearward handgrip having means thereon to mount and suspend a spinning reel therefrom, the median part of said forward handgrip having a passage extending upwardly diagonally therethrough and opening through diametrically opposite top and bottom sides, a grommet-like collar embedded flush in the top side of said forward handgrip and having a guiding hole for paying out as well as retrieving the line, said hole being axially aligned with the upper end of said passage, said collar constituting a thumb rest and line checking and controlling brake, and means for guiding a line from and to said hole, said means comprising a rearwardly downwardly inclined longitudinally extensible and retractible line delivering guide having an upper portion confined and mounted in said passage and a lower portion depending below the bottom side of said forward handgrip and inclined toward the median part of said rearward handgrip, whereby to insure uninterrupted piloting and transfer of the line from the reel's discharge to said collar.

4. The structure defined in claim 3 and wherein said guide means comprises a sleeve having an upper end portion located in and hingedly mounted in an upper portion of the passage, the upper end of said sleeve being oriented and aligned with the opening in said collar, a lower portion of the sleeve depending below the bottom of said forward handgrip, the lower portion of said sleeve being provided with an extensible and retractible thimble.

5. For use in supporting a spinning rod and a spinning reel, handle means embodying forward and rearward end-to-end handgrips, said rearward handgrip having means for the attachment thereto and suspension therefrom of a spinning reel, the intermediate portion of the top side of said forward grip being provided with a marginally flanged collar embedded in and flush with said top side and providing a thumb rest and also an opening for a fishing line, a line guiding sleeve hingedly mounted in a median portion of said forward handgrip and having an upper end oriented and aligned with the opening in said collar, having a lower end depending at a rearwardly and downwardly inclined angle below the bottom of said forward handgrip, said sleeve being provided at its lower end with an elongated thimble having an upper portion telescopingly and adjustably mounted in the bore of the lower portion of the sleeve, the lower portion of said thimble terminating in an outwardly flaring bell mouth adapted to be adjustably aimed and oriented with a line discharge in a spinning reel when the latter is attached to and suspended from said rearward handgrip.

References Cited by the Examiner

UNITED STATES PATENTS

| | | | |
|---|---|---|---|
| 1,276,780 | 8/1918 | Lucas | 43—18 |
| 1,595,275 | 8/1926 | White | 43—18 |
| 2,236,603 | 4/1941 | Nelson | 43—23 |
| 2,282,618 | 5/1942 | Stewart | 43—18 |
| 2,324,429 | 7/1943 | Rondelli | 43—18 |
| 2,547,655 | 4/1951 | Mullins | 43—23 |
| 2,648,505 | 8/1953 | Mauborgne | 43—20 X |

SAMUEL KOREN, *Primary Examiner.*

JOSEPH S. REICH, ABRAHAM G. STONE, *Examiners.*